March 8, 1949. H. J. McCREARY 2,463,708
IMPULSE SENDER
Filed March 10, 1945
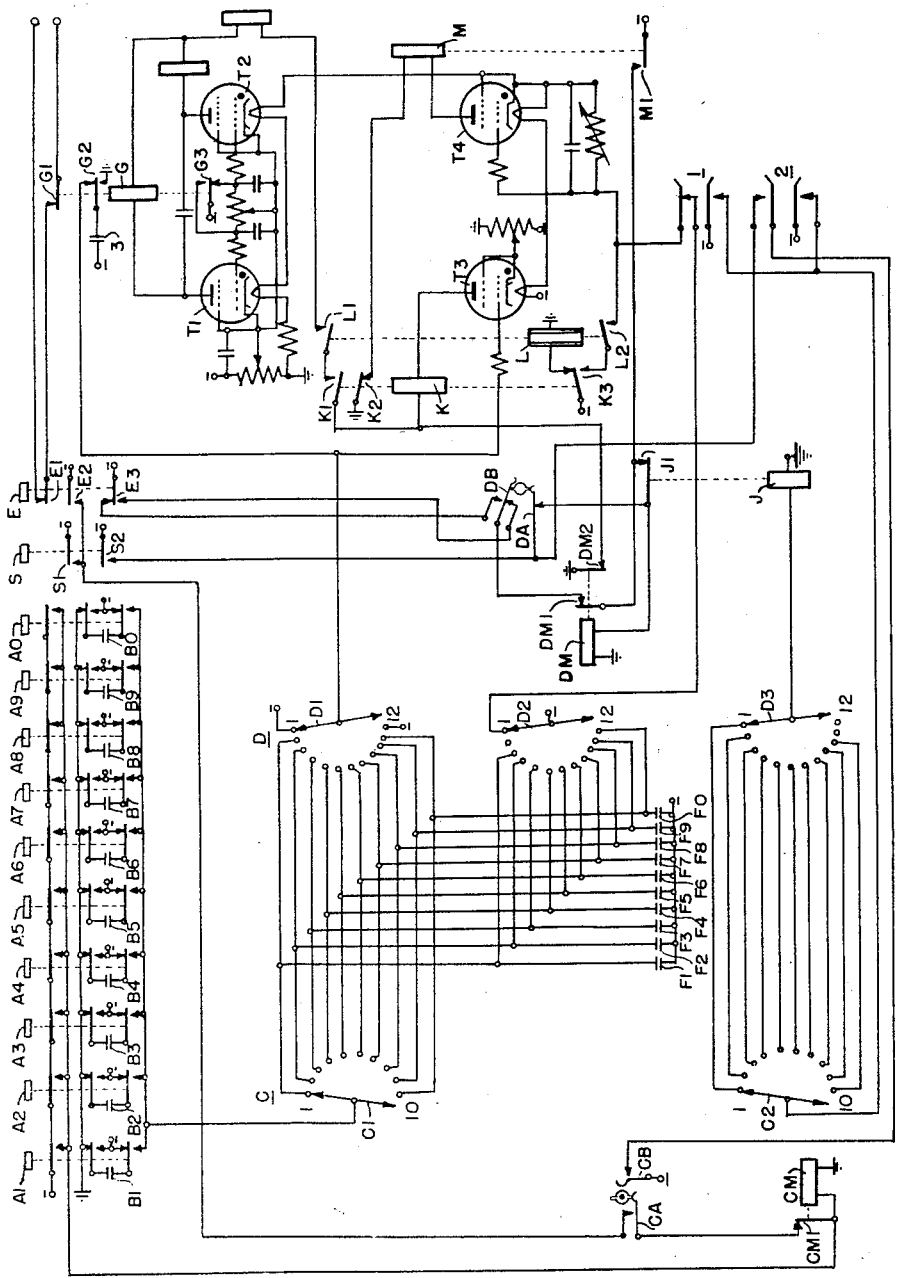
INVENTOR.
HAROLD J. McCREARY
BY
ATTORNEY Patented Mar. 8, 1949

2,463,708

UNITED STATES PATENT OFFICE 2,463,708

IMPULSE SENDER

Harold J. McCreary, Lombard, Ill., assignor to Automatic Electric Laboratories, Inc., Chicago, Ill., a corporation of Delaware Application March 10, 1945, Serial No. 581,983

6 Claims. (Cl. 177—380)

The present invention relates in general to impulse senders and in particular to improvements in impulse senders in which digit values to be transmitted are registered as corresponding charges on condensers.

Several methods have been proposed in the past for sequentially charging a series of condensers to potentials corresponding to digit values by successive operation of keys representing digit values and thereafter utilizing the charges stored on the condensers to control the number of impulses transmitted in each of a series of groups of impulses by an impulse generator. Examples of previously proposed methods are those disclosed in Patents 2,251,666; 2,268,859; and 2,323,019, all issued to Hinrich Döhle. In the first two of the cited patents the register condensers are connected to a source of potential for a predetermined interval of time in series with a resistor the value of which varies in accordance with the digit being registered. In the last one of the cited patents the register condensers are connected for a predetermined time interval to a tap on a voltage divider having a plurality of taps each corresponding to a particular digit value. In each of these cases the register condenser is charged in series with a resistor and it is therefore required that the digit selecting keys be held operated for a sufficient length of time to insure that the register condenser reaches the desired final charge. In the present invention auxiliary normally charged condensers of different capacities are each associated with a corresponding one of a series of digit selecting keys. When a digit selecting key is operated the auxiliary condenser associated therewith is connected in multiple with a register condenser thereby causing the register condenser to acquire a definite charge instantaneously.

The principal object of the present invention is to provide an impulse sender employing condensers for registering digit values in which a register condenser is charged instantaneously to a predetermined potential in response to the operation of a digit selecting key.

A further object of the invention is to provide an impulse sender employing condensers for registering digit values in which the charge placed on a register condenser is governed by the capacity of a series of auxiliary condensers all of which are initially charged to the same potential and any one of which may be momentarily connected to a register condenser.

A still further object of the invention is to provide an impulse sender in accordance with the preceding objects that is operative to start the transmission of impulses in response to the registration of a predetermined number of digits and is thereafter operative to transmit subsequently registered digits in response to their registration.

Other objects of the invention will appear upon a further perusal of the specification taken in conjunction with the accompanying drawing which illustrates an embodiment of the invention in the form of a schematic diagram.

Briefly described, the impulse sender comprises a set of ten digit selecting keys each of which has one of ten condensers of different capacities associated with it. All of these ten condensers are normally charged. A further series of condensers, all of the same capacity, are provided; there being one for each digit in the number to be registered. The digit selecting keys are each arranged to connect their associated condenser to a first one of the register condensers through the wipers of a rotary switch when operated, and are further arranged to cause the rotary switch to advance to a second one of the register condensers when released. Since the energy stored in each of the condensers associated with the digit selecting keys varies in accordance with the keys, the register condensers acquire charges in accordance with the digit values which are to be transmitted. A second rotary switch is provided for successively connecting the register condensers to an impulse counting circuit. The impulse counting circuit consists of a gaseous discharge tube, which is biased to a point below its critical grid potential by the charge on the register condenser; and an auxiliary condenser controlled by an impulse generator, which is arranged to charge the auxiliary condenser during the break period of the impulses and to connect the auxiliary condenser in multiple with the register condenser during the make period of the impulses. The auxiliary condenser discharges and charges in the reverse direction during the make period to an extent determined by the charge remaining on the register condenser whereby a definite increment of charge is abstracted from the register condenser for each impulse. The impulse generator is arranged to concurrently transmit impulses to an output circuit to control automatic telephone switches or the like. When a number of impulses corresponding to the initial charge on the register condenser have been transmitted the remaining charge on the register condenser will have been reduced to a point where the gaseous discharge tube associated with the impulse counting circuit is enabled to fire and thereby stops further transmission of impulses over the control circuit for a predetermined time interval after which the second rotary switch is advanced to the next register condenser and the second series of impulses is counted. Circuit arrangements are provided whereby all of the digits to be transmitted may be registered and the transmission started when desired by the operation of a start key, or whereby the transmission may be automatically started after any desired number of digits have been registered after which subsequently registered digits are transmitted as they are registered. Further circuit arrangements are provided whereby each of the digits may be transmitted in response to its registration.

The invention will now be described in detail with reference to the drawing. The digit selecting keys A1 to A0 and their associated digit selecting condensers B1 to B0 are shown at the upper left. Below the digit selecting keys are two rotary switches C and D. These rotary switches may be of the general type disclosed in Patent No. 1,675,311, granted June 26, 1928, to Hans Sengebusch, in which the wipers advance one step upon each de-energization of the rotary magnet. The upper sets of wiper contacts of these two switches are connected in multiple to ten register condensers F1 to F0. At the upper right of the drawing there is shown an impulse generator comprising gaseous discharge tubes T1 and T2 and relay G. Below the impulse generator there are shown two further gaseous discharge tubes T3 and T4. Tube T3 controls the number of impulses transmitted in a series and tube T4 controls the spacing interval between successive series of impulses. At the top center of the drawing are shown two keys S and E which are used to start the transmission of impulses and to correct errors, respectively. Two locking type keys 1 and 2 which are operated when the digits are to be transmitted in response to their registration or in response to the registration of a predetermined number of digits, respectively, are shown in the lower right hand corner.

The circuit operations will first be described in detail with the assumption that keys 1 and 2 are normal after which the changes in circuit operations brought about by the operation of these keys will be described generally. Assuming first that a ten digit number is to be sent, the digit selecting keys A1 to A0 are successively operated momentarily in accordance with the desired number. If the first digit is a 3, key A3 will be momentarily operated completing a circuit from battery through the upper make contacts of key A3 to the stepping magnet CM of rotary switch C to ground. Condenser B3 is disconnected from battery and ground and connected in parallel with condenser F1 through the first contact of wiper C1 by the lower two sets of contacts of key A3. The charge which was stored in condenser B3 is instantly redistributed between condensers B3 and F1 in proportion to their capacities. The condensers are connected so as to make the upper side of the register condenser F1 negative with respect to the negative battery terminal. When key A3 is released condenser B3 is reconnected to battery and ground causing it to be instantly recharged and the circuit to stepping magnet CM is opened causing it to restore and advance the wipers of rotary switch C one step. Subsequent operations of the keys A1 to A0 causes each one of the register condensers F2 to F0 to receive a charge in accordance with the digit value represented by the particular key A1 to A0 that is operated while the wiper C1 is connected to that one of the register condensers. The stepping magnet CM is operated and released once for each operation of one of the keys A1 to A0 causing wiper C1 to advance one step each time a digit key is restored. After ten operations of the digit keys wiper C1 will have rotated through one-half a revolution and will again be resting on the first contact. When it is desired to transmit impulses corresponding to the digit values which have been registered as varying charges in condensers F1 to F0 start key S is momentarily operated closing a circuit to stepping magnet DM from battery through contacts S2 and DA. Stepping magnet DM operates. When contacts S2 are opened magnet DM restores and advances the wipers of rotary switch D to the second set of wiper contacts. The cam contacts DA are operated at this time and will remain so until the wipers again reach the first set of contacts. While wiper D1 was standing on the first contact it connected negative battery to the grid of tube T3. The cathode and screen grid of tube T3 are connected to a tap on a voltage divider connected across the battery. This tap is adjusted so that the negative bias applied to the grid of tube T3 is slightly less than that required to prevent the tube from firing. Thus tube T3 is normally fired causing the relay K connected in its anode circuit to be normally operated. Relay K in turn maintains a slow to release relay L normally operated. When magnet DM was operated it opened the anode circuit of tube T3 at contacts DM2 causing the tube to be extinguished and relay K to be released. When the magnet DM restored it advanced wiper D1 to the second contact thus connecting register condenser F1 to the grid of tube T3 which prevents the tube from firing again when contacts DM2 reclose. When wiper D1 is advanced to the second contact it also connects condenser 3 in multiple with condenser F1. The charge stored in condenser F1 is then redistributed between condensers F1 and 3 in proportion to their capacities. This redistributed charge is always high enough to prevent the firing of tube T3. Relay K opened the circuit to relay L which restores after a brief delay and closes a circuit to the impulse generator at contacts L1. This impulse generator is described in detail in my copending application, Serial No. 560,076, filed October 23, 1944, now Patent No. 2,458,283, dated January 4, 1949. It will therefore be only briefly described here. The restoration of relays K and L connects ground to the anodes of tubes T1 and T2 through contacts DM2, K1, and L1. Tube T1 fires and operates relay G. Relay G operates and transfers negative battery from the grid of tube T2 to the grid of tube T1 at contacts G3. After a time interval determined by the time constant of the resistance and capacitance in the grid circuit of tube T2 the potential on the grid of T2 falls to a point where tube T2 fires. The firing of T2 extinguishes tube T1 due to the capacitative coupling between the anodes of the two tubes and thus causes the release of relay G. Relay G restores and transfers negative battery back to the grid of T2 at contacts G3. After a further time interval determined by the time constant of the resistance and capacitance in the grid circuit of tube T1 the potential on the grid of tube T1 falls to a point where tube T1 again fires. This cycle of operations continues as long as ground is connected to the anodes of the tubes. The speed of operation is controlled by adjustment of the voltage divider having its tap connected to the cathodes of tubes T1 and T2, and the ratio of the operated to the released intervals of relay G is controlled by adjustment of the slider on the potentiometer connected between the grids of the tubes.

Each time that relay G operates it disconnects condenser 3 from condenser F1 and connects it to ground at contacts G2 causing condenser 3 to be discharged and charged in the reverse direction to the potential of the battery. Relay G also opens the impulsing circuit, which is connected to automatic telephone switching apparatus or the like, at contacts G1. Each time that relay G restores it recloses the impulsing circuit at contacts G1 and reconnects condenser 3 in multiple with condenser F1. Condenser 3 then discharges and recharges in the reverse direction to an extent depending on the remaining charge on condenser F1. The values of the condensers are so chosen that when relay G restores for the third time the remaining charge on condenser F1 is reduced to a point where tube T3 is enabled to fire and operate relay K. Relay K operates, opens the circuit to the impulse generator at contacts K1 to stop further transmission of impulses, closes the anode circuit of tube T4 at contacts K2, and closes the circuit to relay L and removes negative battery from the grid of tube T4 at contacts K3. Relay L operates and opens further points in the impulse generator circuit and the grid circuit of tube T4 at contacts L1 and L2, respectively. Before the wiper D2 left the first contact it connected negative battery through key 1 to the grid of tube T4 which prevented it from firing. When the wiper D2 was advanced to the second contact negative battery was connected to the grid of T4 through contacts K3 and L2. When this latter source of negative battery is opened after the transmission of the first series of impulses the condenser connected between the grid and cathode of T4 discharges through the adjustable resistor connected across it. After a time interval determined by the adjustment of this resistor the grid potential of tube T4 reaches the critical value where the tube fires and operates relay M. Relay M operates and closes a circuit to magnet DM at contacts M1. Magnet DM operates and opens the anode circuit of tube T3 at contacts DM2. Tube T3 is thus extinguished and relay K released. Relay K restores and opens the anode circuit of tube T4 at contacts K2 causing tube T4 to be extinguished and relay M released. Relay M restores and opens the circuit to DM which restores and advances the wipers D1 to D3 to the third step. When contacts DM2 reclose tube T3 will be prevented from striking by the potential applied to its grid by condenser F2. Relay K therefore remains released and when relay L subsequently restores the circuit to the impulse generator is again closed and negative battery is reconnected to the grid of T4 to charge the condenser in its grid circuit preparatory to measuring the next spacing interval. When wiper D2 was advanced to the third step it short-circuited condenser F1 to remove any residual charge which may have been left on the condenser. Nine more series of impulses are now counted out in the same manner as the first except that the initial charges on condensers F2 to F0 determine how many operations of relay G are required in each series to reduce the charge on the register condenser corresponding to that series to the point where tube T3 is enabled to fire. At the conclusion of the tenth series of impulses the rotary switch D1 will be advanced to the twelfth step where cam contacts DB operate and close a self-interrupting circuit to magnet DM from the break contact of E3, through the make contact of DB, and contacts DM1 and J1. The stepping magnet operates self-interrupting to advance the wipers D1 to D3 to the first step where cam contacts DB restore to prevent further operation of DM. Wiper D1 connects negative battery to the grid of T3 causing it to fire and operate relay K. Wiper D2 connects negative battery to the grid of T4 which prevents T4 from firing when relay K reoperates. All of the apparatus has now been restored to normal, relays K and L being operated which is their normal state.

In the event that an error is made in operating the digit selecting keys the error key E is operated. This may be done before any digits have been transmitted or after transmission has started. The contacts E1 open the impulsing circuit to release the equipment controlled by the impulse sender in the event that some of the digits have been transmitted. Contacts E2 close a homing circuit to stepping magnet CM in series with contacts CM1 and the cam contacts CA of rotary switch C causing magnet CM to operate self-interrupting to drive the wipers C1 and C2 to the first step where the cam contacts CA open to stop further operation of CM. A similar homing circuit is closed to stepping magnet DM by contacts E3 through cam contacts DB of rotary switch D, contacts DM1, and contacts J1 which causes stepping magnet DM to operate self-interrupting to drive the wipers D1 to D3 to the twelfth step where contacts DB operate to prevent further operation of DM. When the error key E is restored the circuit to DM is reclosed through the break contact of E3 and the make contact of DB causing magnet DM to advance wipers D1 to D3 to the first step where contacts DB restore. Thus rotary switch D completes a half-revolution regardless of whether it is off-normal or not at the time the error key is operated. If rotary switch D was off-normal, for example on step 3, the first digit would have already been sent and condenser F1 would be short-circuited by wiper D2. Operation of the error key causes the half-revolution of rotary switch D which was initiated by operation of the start key S to be completed causing wiper D2 to short-circuit all of the register condensers F1 to F0 which it has not already short-circuited. The rotary switches C and D are thus restored to normal, the register condensers F1 to F0 are discharged, and the switching equipment controlled by the impulse sender is released, in response to the operation of the error key E.

In the preceding description it was assumed that ten digits were to be transmitted. In the event that it is desired to transmit a lesser number of digits, say five for example, the digit selecting keys A1 and A0 are operated five times in accordance with the desired number causing charges commensurate with the digits in the desired number to be stored in register condensers F1 to F5 as previously described. The start key S is now operated causing the impulse sender to start the transmission of impulses under the control of the register condensers and in addition closing a homing circuit to stepping magnet CM of rotary switch C from battery at contacts S1, through cam contacts CA and contacts CM1 to CM. Magnet CM operates self-interrupting to drive wipers C1 and C2 to the first step where cam contacts CA open to prevent further operation of CM. Impulses are transmitted under the control of register condensers F1 to F5 exactly as previously described. At the conclusion of the fifth series of impulses tube T3 fires, relays K and L operate, tube T4 fires after a predetermined time interval and operates relay M, relay M closes the circuit to magnet DM which operates and opens the circuit to relay K and the anode of T3, relay K restores and opens the circuit to relay M and the anode of T4, relay M restores to open the circuit to DM. When the stepping magnet DM restores it advances the rotary switch wipers to the seventh step. Wiper D1 then connects condenser F6 to the grid of T3 which fires immediately since there is no charge stored in condenser F6. Relay K operates and closes the anode circuit of T4 at contacts K2. During the brief interval during which relay K was restored relay L remained operated and therefore tube T4 will fire immediately since the condenser connected in its grid circuit will not be charged. Relay K, relay M, and magnet DM thus operate and restore in succession to advance the rotary switch wipers to the first step where negative battery is connected to the grid of tube T4 by wiper D2 to prevent further operation of relay M. During this homing operation contacts L1 maintain the impulse generator inoperative.

If it is desired that the impulse sender should transmit digits as they are recorded, instead of waiting until all of the digits have been recorded and start key S operated, the key 1 may be operated. The operation of key 1 closes a circuit to relay J through wipers C2 and D3, and disconnects negative battery from the grid of T4. Relay J operates. Tube T4 fires after a delay period and operates relay M. Relay M operates and prepares a circuit to the magnet DM at contacts M1, which circuit is open at contacts J1. Now as soon as rotary switch C is advanced in response to the operation of a digit selecting key the circuit to relay J will be opened at wiper C2. Relay J restores and closes the circuit to DM which operates and opens the circuits to relay K and the anode of T3. Relay K restores and opens the circuits to relay M and the anode of T4. Relay M restores and opens the circuit to magnet DM which restores and advances the wipers D1 to D3 to the second step. Impulses corresponding to the charge in condenser F1 are now transmitted as before after which tube T3 fires and operates relay K causing the firing of tube T4 and operation of relay M after the spacing interval. If no further digits have been stored relay J will be operated so that operation of magnet DM by contacts M1 is prevented. If or when further digits are stored relay J releases and permits magnet DM to operate and advance rotary switch D until it again catches up to rotary switch C. When all of the desired digits have been stored rotary switch C is homed to the first step by a momentary operation of key S in case there are less than ten digits in the number being transmitted. The remaining operations of the impulse sender are the same as previously described except that the rotary switch D is stopped on the first step through the operation of relay J rather than through the connection of negative battery to the grid of T4 by wiper D2.

If it is desired to have the impulse sender start automatically in response to the registration of a predetermined number of digits key 2 is operated and key 1 is restored to normal. Key 2 closes a circuit to relay J through wipers C2 and D3 and prepares a circuit from cam contacts CB through cam contacts DA to magnet DM. This latter circuit is open at contacts DB. Since negative battery remains connected to the grid of T4 when key 2 is operated tube T4 will normally be deionized and relay M will normally be released. Relay J will be released as soon as rotary switch C is advanced in response to the operation of a digit selecting key just as when key 1 was operated but in this case relay M is restored so that magnet DM remains deenergized. Cam contacts CA may be set so as to operate after rotary switch C has advanced any desired number of steps. If it is desired that transmission of impulses should start after three digits have been stored, the contacts CB are set so as to operate when rotary switch C is resting on the third step. When rotary switch C advances to the third step in response to the registration of two digits, cam contacts CB operate and close the previously traced circuit to magnet DM. Magnet DM operates and opens the circuits to relays K and L and the anode of T3. Relays L and K restore. When rotary switch C advances to the fourth step in response to the registration of the third digit, cam contacts CB restore and open the circuit to DM. Magnet DM restores and advances the wipers of rotary switch D to the second step. Subsequent operations are identical to those described for the operation of key 1 except that when rotary switch D again reaches the first step negative battery is connected to the grid of tube T4 by wiper D2 so as to prevent relay M from being operated and thus preventing further operation of magnet DM until cam contacts CB are again closed.

In the following table the voltages initially impressed on the register condensers by each of the digit selecting condensers and the successive steps in the reduction of the voltage across the register condenser by repeated operations of relay G are shown for typical values of the condensers that are suitable for use with a 48 volt battery and with a gaseous discharge tube such as the type 2050 used for T3. In this table digits 1 to 0 are shown in column A. In column B are given suitable values of capacity in microfarads for digit selecting condensers (A1 to A0) corresponding to the digits in column A. In column C are the voltages that are impressed on a 2 mf. register condenser (F1 to F0) after being connected in parallel with a digit selecting condenser of the value shown in column B and which has been initially charged to 48 volts. In column D the remaining voltage on the 2 mf. register condenser after being connected in parallel with an initially discharged condenser (3) of .1 mf. is shown. When read upwards, column D also shows the successive steps in the reduction of the voltage across the register condenser caused by the connection of a .1 mf. condenser (3) in parallel therewith which has been initially charged to 48 volts in the opposite direction. Thus nine operations of relay G cause a register condenser initially charged to 30.3 volts to be discharged to 2.4 volts. The tenth operation of relay G causes the register condenser to be completely discharged.

| A | B | C | D |
|---|---|---|---|
| 1 | .111 | 2.52 | 2.4 |
| 2 | .241 | 5.17 | 4.92 |
| 3 | .396 | 7.92 | 7.56 |
| 4 | .586 | 10.9 | 10.4 |
| 5 | .817 | 13.9 | 13.2 |
| 6 | 1.11 | 17.1 | 16.3 |
| 7 | 1.53 | 20.8 | 19.8 |
| 8 | 2.01 | 24.1 | 22.9 |
| 9 | 2.73 | 27.7 | 26.5 |
| 0 | 3.92 | 31.8 | 30.3 |

While the invention has been described with a certain degree of particularity, it should be apparent that numerous modifications may be resorted to without departing from the spirit and scope of the invention as defined in the appended claims.

What is claimed is:

1. In an impulse sender, a plurality of condensers each having a charge commensurate with a digit value represented by the condenser, a register condenser, means for selectively connecting any one of said first condensers to said register condenser to thereby transfer a portion of the charge on the first condenser to the register condenser, an impulse generator, and means controlled by the charge on said register condenser for causing said impulse generator to produce a corresponding series of impulses.

2. In an impulse sender, a plurality of condensers each having a different capacity, a source of potential normally connected to all of said condensers, a register condenser, means for selectively transferring the connection of any one of said first condensers from said source to said register condenser to thereby charge the register condenser to a degree commensurate with a digit value represented by said one first condenser, an impulse generator, and means controlled by the charge on said register condenser for causing said impulse generator to produce a corresponding series of impulses.

3. In an impulse sender, a plurality of condensers, means for successively charging each of said condensers to any one of a plurality of voltages to register a digit value therein, an impulse generator, means responsive to the registration of a predetermined plurality of digits for causing said impulse generator to produce impulses in accordance with the digit values registered in said condensers, said means being responsive to the subsequent registration of a digit to cause the impulse generator to produce impulses in accordance with the subsequently registered digit.

4. In an impulse sender, a plurality of condensers, means for successively charging each of said condensers to any one of a plurality of voltages to register a digit value therein, an impulse generator, means responsive to the registration of a predetermined plurality of digits for causing said impulse generator to produce a series of groups of impulses, each group corresponding to a digit value registered in said condensers, said means being responsive to the registration of each of a number of further digits to cause the impulse generator to produce a corresponding group of impulses.

5. In an impulse sender, an impulse generator, means comprising a plurality of condensers having different capacities, and means controlled by said condensers for causing said impulse generator to produce a series of impulses corresponding to any one of a plurality of digit values, each of said condensers corresponding to a particular digit value.

6. In combination, an impulse generator comprising a pair of gaseous discharge tubes, a relay controlled by one of said tubes, means controlled by said relay for causing said tubes to be fired alternately at predetermined intervals in response to successive operations and restorations of said relay, and means for extinguishing either tube in response to the firing of the other tube whereby said relay may be operated intermittently by the alternate firing of said tubes, a third gaseous discharge tube, a plurality of condensers, means for charging each of said condensers to any one of a plurality of voltages each corresponding to a digit value, switching means for successively associating said condensers with said third tube, a second relay controlled by said third tube for starting said impulse generator when a charged one of said condensers is associated with the third tube, an auxiliary condenser controlled by contacts on said first relay for neutralizing the charge on said one charged condenser in predetermined steps, said third tube firing after a number of operations of said first relay corresponding to the digit value of the charge on said one condenser, said second relay stopping the operation of said impulse generator in response to the firing of the third tube and causing another of said condensers to be associated with the third tube by the switching means after a predetermined time interval, and an impulsing circuit connected to other contacts on said first relay.

HAROLD J. McCREARY.

REFERENCES CITED

The following references are of record in the file of this patent:

UNITED STATES PATENTS

| Number | Name | Date |
|---|---|---|
| 476,088 | Snell et al. | Dec. 1, 1937 |
| 1,714,302 | Fisher et al. | May 21, 1929 |
| 2,002,219 | Dimond | May 21, 1935 |
| 2,047,463 | Doublier | July 14, 1936 |
| 2,251,666 | Dohle | Aug. 5, 1941 |
| 2,268,859 | Dohle | Jan. 6, 1942 |
| 2,282,916 | Wolf | May 12, 1942 |
| 2,294,464 | Lamberty et al. | Sept. 1, 1942 |
| 2,323,019 | Dohle | June 29, 1943 |